US012452330B1

(12) United States Patent
Jiang (10) Patent No.: US 12,452,330 B1
(45) Date of Patent: Oct. 21, 2025

(54) DEVICE-TO-DEVICE CONTENT RECOMMENDATION AND TRANSMISSION BETWEEN TWO DEVICES VIA A DIRECT DEVICE-TO-DEVICE WIRELESS CONNECTION

(71) Applicant: Xender (HK) Limited, Hong Kong (CN)

(72) Inventor: Tianpeng Jiang, Hong Kong (CN)

(73) Assignee: Xender (HK) Limited, Hong Kong (CN)

( * ) Notice: Subject to any disclaimer, the term of this patent is extended or adjusted under 35 U.S.C. 154(b) by 13 days.

(21) Appl. No.: 18/762,732

(22) Filed: Jul. 3, 2024

(51) Int. Cl.
 *H04L 67/06* (2022.01)
 *H04W 76/14* (2018.01)

(52) U.S. Cl.
 CPC ............. *H04L 67/06* (2013.01); *H04W 76/14* (2018.02)

(58) Field of Classification Search
 None
 See application file for complete search history.

(56) References Cited

U.S. PATENT DOCUMENTS 8,745,755 B2 * 6/2014 Borzycki ............ G06F 21/6218
 380/255
2011/0300834 A1 12/2011 Ni
2016/0103668 A1 * 4/2016 Srinivasan ................ G06F 8/61
 717/178
2019/0102237 A1 4/2019 Dong
2023/0168784 A1 * 6/2023 Zhang ................... G06F 3/0481
 715/781

FOREIGN PATENT DOCUMENTS

WO 2007019469 A2 2/2007
WO 2007019469 A3 4/2009

OTHER PUBLICATIONS

Extended European Search Report issued in App. No. EP24186780, dated Jan. 7, 2025, 7 pages.
European Patent Office, European Search Report for application EP 24186780.3, Jan. 7, 2025, 7 pages.

\* cited by examiner

*Primary Examiner* — Quang N Nguyen
(74) *Attorney, Agent, or Firm* — Loeb & Loeb LLP

(57) ABSTRACT

A mobile computer system for a device-to-device content recommendation including a processor configured to execute computer-executable instructions for establishing a directed device-to-device connection between a source app of a first device and a destination app of a second device. The processor further receives a selection of one or more files to be transferred to the destination app via a graphical user interface. The processor further analyzes one or more of the following: the selected one or more files, and the apps already installed on the first device. The processor identifies a content to be recommended to the second device, wherein the identified content may be initially invisible to a user before the selection. In response to the identification and the selection, the processor locates data of the content in the first device and selects the content to be transferred along with the selection of the one or more files.

17 Claims, 6 Drawing Sheets

DEVICE-TO-DEVICE CONTENT RECOMMENDATION AND TRANSMISSION BETWEEN TWO DEVICES VIA A DIRECT DEVICE-TO-DEVICE WIRELESS CONNECTION

TECHNICAL FIELD

Aspects of the invention generally relate to software recommendations. In particular, aspects of the invention relate to the transfer of recommended software or application in response to a selection of a file or content.

BACKGROUND

Mobile devices are omnipresent and provide a vast variety of functions and features. These features and functionalities are brought about by a combination of hardware and software. In certain situations, with a given set of hardware configurations, software developers often create ingenious applications and solutions.

Mobile phone users typically obtain applications ("apps") or software from application (app) marketplace, aggregators, or stores. For example, Apple IOS users may be able to obtain apps from App Store or links to the App Store. Android mobile users may obtain apps from Google Play Store or other Android app aggregators or stores. Other sources such as advertisements from apps or websites may provide recommendations or suggestions for app downloads.

However, users usually obtain these recommendations by reading reviews or pop-up ads. These approaches are unreliable and could be misleading.

SUMMARY

Aspects of the invention provide automatic application(s) or software suggestions or recommendations for download or transfer between friends' mobile devices based on apps contents already installed in the friends' mobile device. In some embodiments, the suggestion or recommendation may be triggered in response to a selection of a file or contents to be transferred between to mobile devices. In some other embodiments, the selection may be configured in response to a selection by a user. In yet some embodiments, the selection may be configured in response to the file being available for transfer or download.

BRIEF DESCRIPTION OF THE DRAWINGS

The present disclosure may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
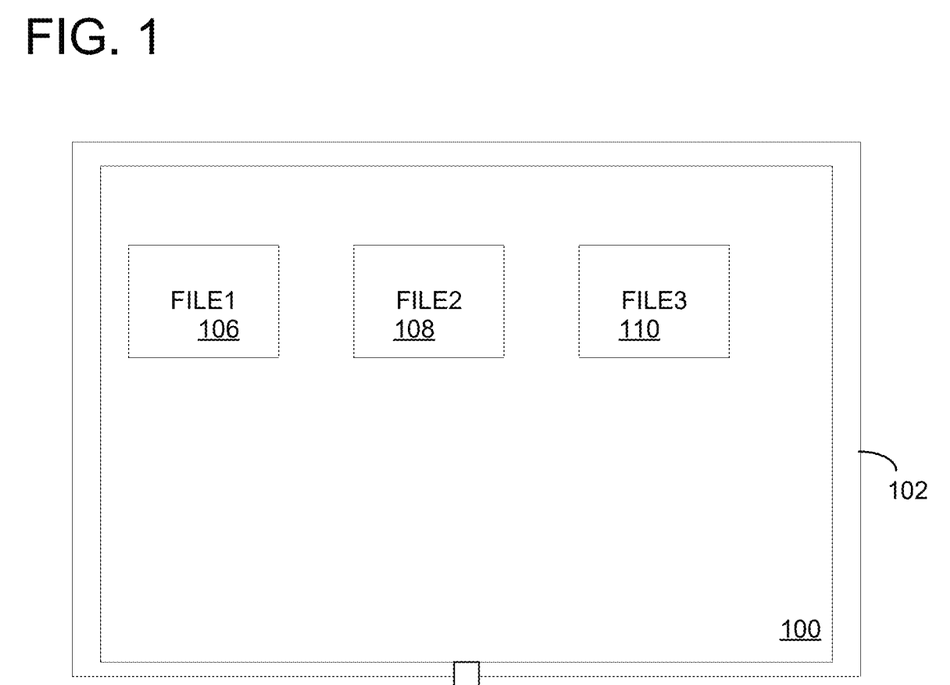
FIGS. 1-2 are graphical user interface (GUI) displays of a device-to-device file transfer system according to one embodiment.
Figure 2:
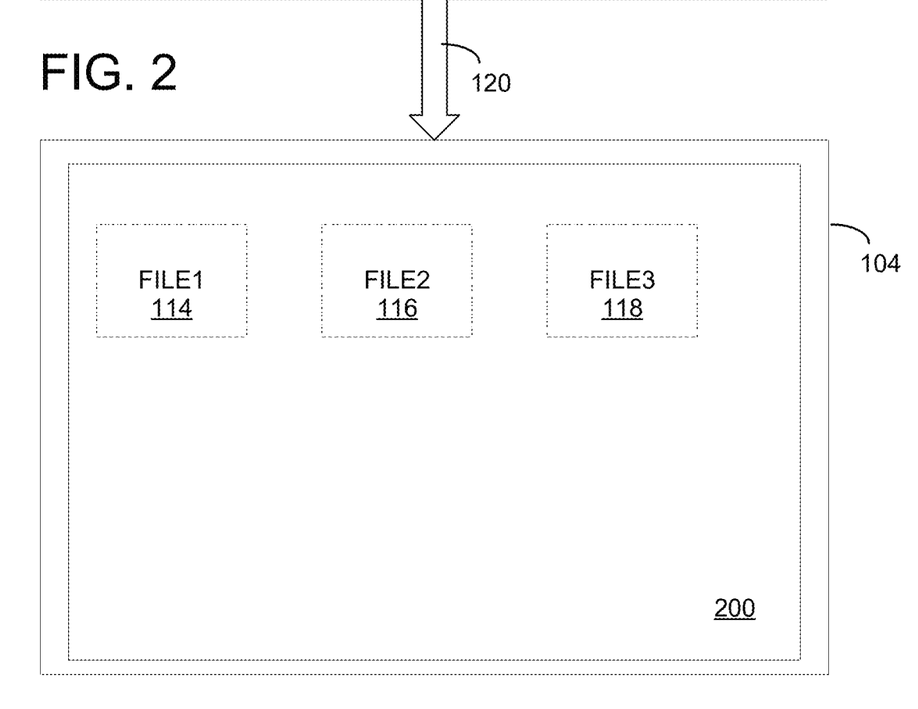

Referring to FIGS. 1-2, diagrams illustrate graphical user interface (GUI) displays of an auto-app recommendation system and method according to one embodiment. In one embodiment, a first device 102 may belong to a first user. In one example, the first user may wish to transfer some contents via the auto-app recommendation system (hereinafter "app") 100 to a second user whose device is a second device 104. In one example, the contents may be document files, music files, video files, etc. In yet another embodiment, the app 100 may include software application or computer program for initiating and conducting the transfer.

Figure 6:
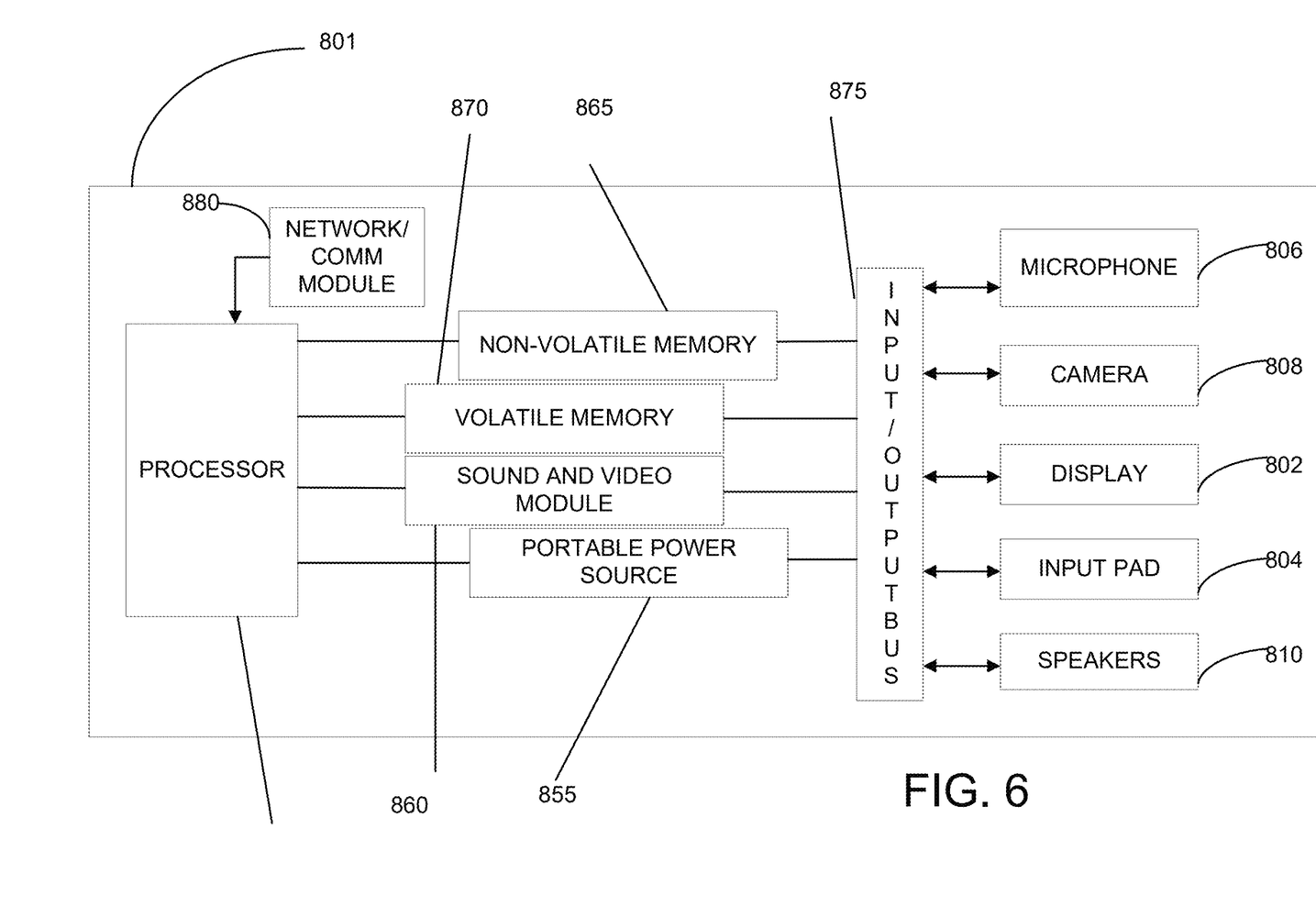
FIG. 6 is a diagram illustrating a portable computing device according to one embodiment.

In some embodiments, the first device 102 may connect with the second device 104 via wireless connections. For example, the first device 102 and the second device 104 may be portable or mobile computing devices as illustrated in FIG. 6 where the first device 102 and the second device 104 may include wireless network devices or adapters. In addition, the first user may operate the first device 102 via its input and output components to initiate the transfer. In another embodiment, the first user may use the app 100 to initiate or conduct the transfer.

In one example, the first device 102 may connect to the second device 104 via a wireless connection, such as Wi-Fi®. In another embodiment, a connection 120 between the first device 102 and the second device 104 may be a direct device-to-device connection via the wireless, such as Wi-Fi®, network protocol between the two mobile devices. In one aspect, the direct device-to-device connection establishes a connection between the first device 102 and the second device 104 such that the transfer of data is done through this connection only. For example, the connection is a one-to-one or point-to-point wireless connection. In another example, this point-to-point connection may be in the form of a tethering, a hotspot connection, an ad-hoc connection, or the like. The first device 102 and the second device 104 are mobile devices such as mobile or smartphones. In another embodiment, the first device 102 and the second device 104 use mobile operating system, such as Apple® iOS®, Android, or the like.

For example, the point-to-point wireless connection may be established when the first device 102 initiates a Wi-Fi hotspot or a wireless access point invitation for the second device 104 to join. In another embodiment, the point-to-point wireless connection may be an ad-hoc network mode, which may be a type of wireless connection in small-scale networks, such as in homes, offices, or cafes. In one example, the small-scale is between the first device 102 and the second device 104. In one aspect, the ad-hoc mode in networking is to connect two or more devices wirelessly without the need for a centralized access point. In an ad-hoc network, devices communicate with each other directly without the involvement of any intermediary device. This mode is also known as Peer-to-Peer (P2P) mode.

It is to be understood that the wireless connection is not limited to the Wi-Fi protocol. Aspects of the invention envision wireless connections, such as under Bluetooth, NFC, NearLink, or the like for the first device 102 to connect to the second device 104.

Once the direct device-to-device connection 120 is made, the first user may select FILE1 106, FILE2 108, and FILE3 110 to be transferred from the first device 102 to the second device 104.

Referring now to FIG. 2, the GUI display of the second device 104 may be destined to receive the FILE1 114, FILE2 116, and FILE3 118 (as shown via the dashed lines). In other to receive the FILE1 114, FILE2 116, and FILE3 118 at the second device 104, the second device 104 may have an app 200 that is similar to that of the app 100. For example, the app 100 and app 200 may be identical where they are installed in the first device 102 and the second device 104, respectively. As such, the app 100 and the app 200 may have a reciprocal or mirroring features or functions. In one aspect, as described above, the app 100 may be configured to send the FILE1 106, FILE2 108, and FILE3 110 from the first device 102 to the second device 104. The second device 104 would also have the app 200 activated to receive the FILE1 114, FILE2 116, and FILE3 118. In yet another embodiment, the direct device-to-device connection discussed above may be configured through the app 100 and the second app 200. For example, the first user may use the app 100 to initiate the direct device-to-device connection, which may include sending a request or an invite from the app 100 to the app 200. The user who operates the second device 104 may then use the app 200 to accept the direct device-to-device connection. In one embodiment, the second device 104 may further simplify the display of the GUI in FIG. 2. In yet another embodiment, the second device 104 may further show a transfer progress bar informing the second user of the status of the transfer.

Figure 3A:
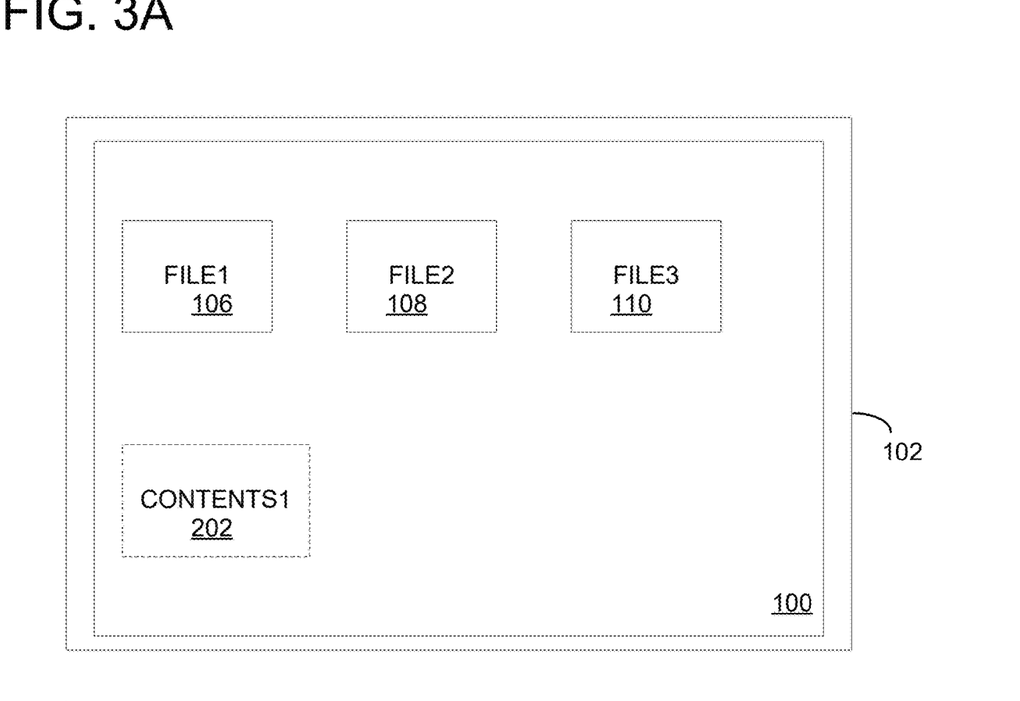
FIGS. 3A to 3B are GUI displays of an auto-app recommendation system and method according to one embodiment.

Referring now to FIG. 3A, the diagram illustrates a further aspect of embodiments of the invention. In one embodiment, the app 100 may suggest contents, such as files. In one aspect, the files may include documents, music files, video files, image files, or the like. In another embodiment, the suggested contents may be an application or software program (e.g., app) to be transferred to the second user at the second device 104. In particular, the app 100 may automatically suggest a CONTENT1 202 to be transferred from the first device 102 to the second device 104. In one example, the CONTENT1 202 may be an application or app already installed in the first device 102. In one embodiment, during the process of selecting or identifying of the FILE1 106, FILE2 108, and FILE3 110, aspects of the invention may trigger an initiation of the recommendation by the app 100. At a next step, the app 100, when it comes recommending software applications, may search installed application programs in the first device 102 to generate a search result. In one embodiment, the app 100 may identify the installed application programs by searching through the application program index, registry, or a collection or storage of the application programs installed in the first device 102.

In another embodiment, once the initiation step is triggered, such as in response to the selection or identification of the FILE1 106, FILE2 108, and FILE3 110, the app 100 may review metadata of the FILE1 106, FILE2 108, and FILE3 110 to analyze the nature of the FILE1 106, FILE2 108, and FILE3 110. In one aspect, the app 100 may save the analyzed data locally in the device 102.

In another embodiment, the app 100 may send the saved search result to the remote server for further processing. In one aspect, the remote server may use the search result and the metadata as part of the communications with the device 100.

Contrary to the prior art, where the recommendation was based on the usage frequency of the recommended app on the first device 102. However, such factor might not consider the fact that the first device 102 might not be used by the same user. As such, the usage frequency might not be relevant.

Aspects of the invention improve over the prior art by performing a recommendation of contents based on the searched result or analyzed results. In one embodiment, a processor of the first device 102 is configured to execute the app 100 to analyze the search result.

In one aspect, as the app 100 analyzes the result, the app 100 may consider one or more factors such as the type of files that are selected, how many apps that are currently installed in the first device 102, and how often does the app 100 is used to transfer files to the second device 104 via the app 200. As such, the app 100 may recommend or suggest CONTENT1 202 to be sent from the first device 102.

Once the app 100 suggests the CONTENT1 202, the CONTENT1 202 may be displayed by the app 100 for selection by the first user, as shown by the dashed lines. In addition, the app 100 may search within the first device 102 to identify data of the CONTENT1 202. For example, if the CONTENT1 202 is a document, music, video, or image file, the app 100 may review the file storage structure to identify the data and place it temporarily in a temporary storage for transfer. In another embodiment, if the CONTENT1 202 is an app, the app 100 may then search the first device 102 to retrieve an installation package for the CONTENT1 202 and place it in the temporary storage for transfer.

As such, as shown in FIG. 3A, the recommended or suggested CONTENT1 202 is shown in dashed lines or greyed to indicate that these are ready for recommendation. They are not visible to the user yet.

Figure 3B:
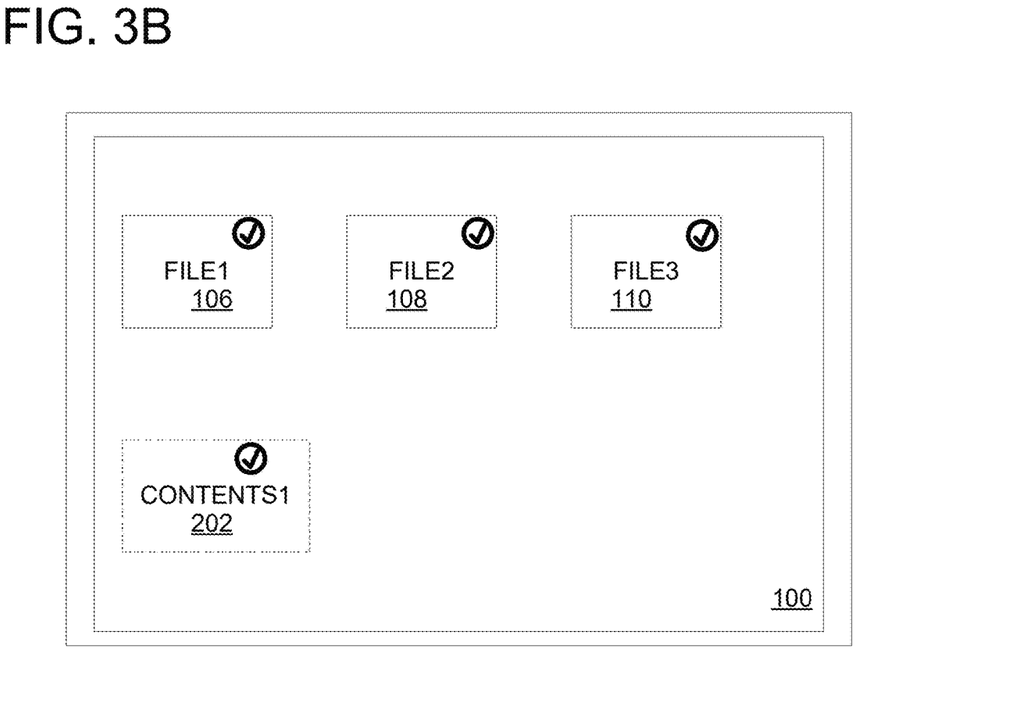

However, as shown in FIG. 3B, as soon as the user selects the one or more files FILE1 106, FILE2 108, and FILE3 110, the CONTENT1 202 is automatically selected for the transfer. In another embodiment, the CONTENT1 202 may be automatically suggested to be transferred from the first device 102 to the second device 104. In one embodiment, the "check mark" is displayed showing that the CONTENT1 202 is selected for transfer in FIG. 3B. It is to be understood that other indication or indicia may be shown without departing from the scope or spirit of the invention.

Figure 4:
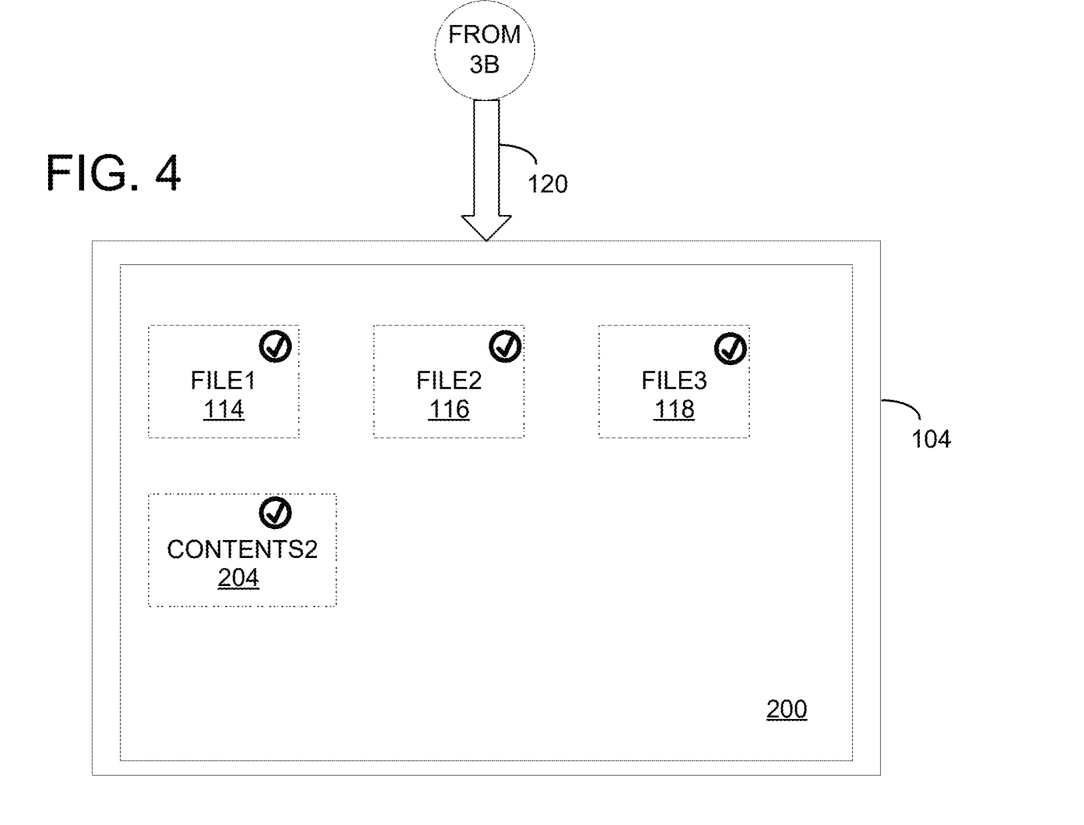
FIG. 4 is another GUI display of the auto-app recommendation system and method according to one embodiment.

As shown in FIG. 4, the suggested CONTENT1 202 may be transferred to the second device 104 as CONTENT2 204 during the transfer of the FILE1 114, FILE2 116, and FILE3 118 via the connection 120. In one aspect, the suggested CONTENT1 202 may be the installation package of the suggested CONTENT1 202. Upon a successful transfer, the second device 104 may be ready to execute the installation package of the CONTENT2 204 to install on the second device 104.

Embodiments of the invention no longer rely on external sources to recommend contents between the devices. Via the direct device-to-device, the first device 102 no longer needs to be in a connection to search for the recommended contents on the internet. Rather, the first device 102 may search within its device for the source of recommendation. This would heighten the trust degree of the recommendation for the user of the second device 104.

Figure 5:
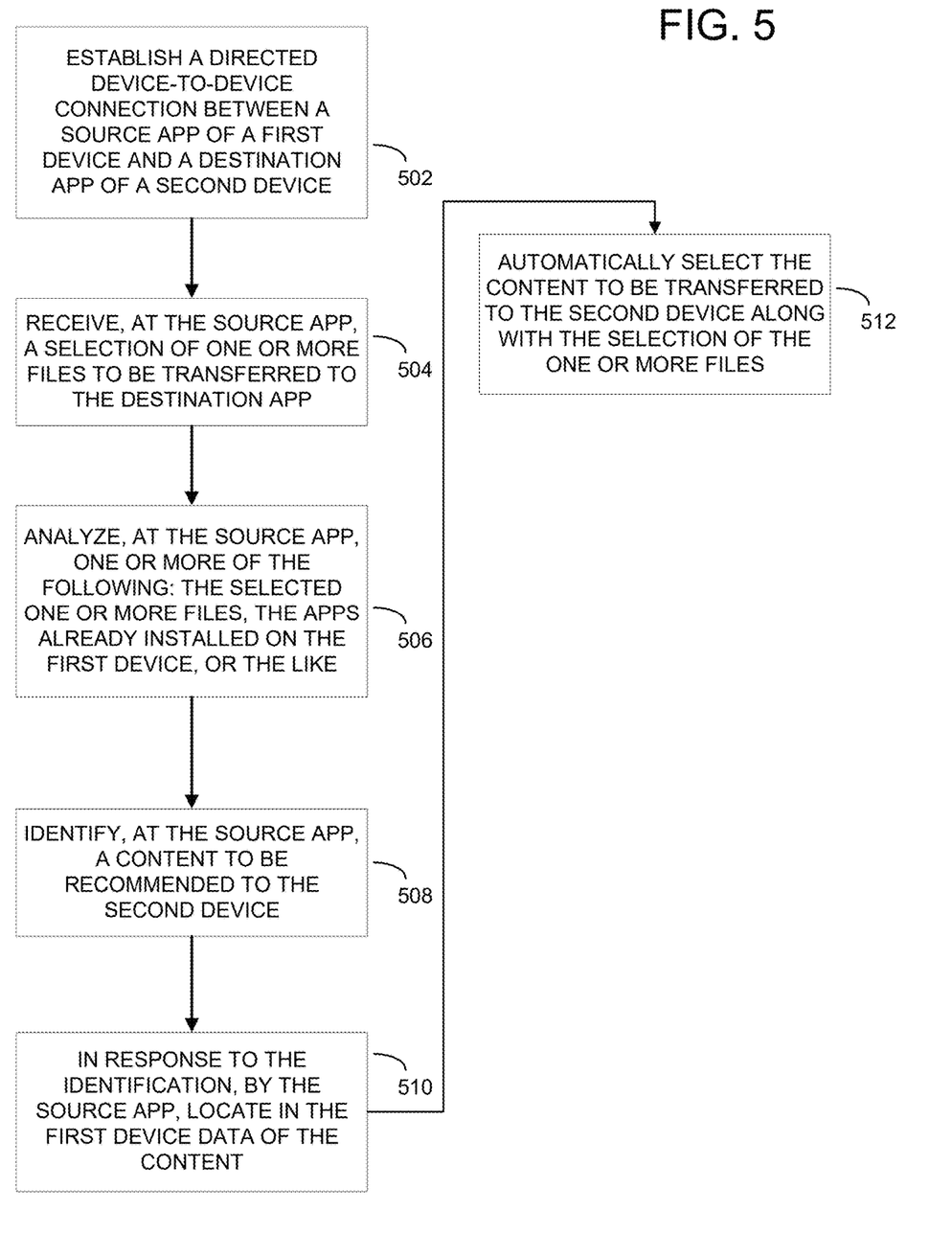
FIG. 5 is a flow chart illustrating the auto-app recommendation method according to one embodiment.

Referring now to FIG. 5, a flow chart illustrates a diagram showing methods of auto-app recommendation according to one embodiment. In one aspect, the auto-app recommendation may start from the first device 102. For example, at 502, as discussed, a source app, such as the app 100, may establish a direct device-to-device connection between the source app of the first device and a destination app, such as the APP 200 of the second device, such as the second device 104. At 504, the source app may receive a selection of one or more files to be transferred to the destination app. In one embodiment, the one or more files exclude an application program or software program.

In another embodiment, at 506, in response to the selection, the source app may analyze one or more of the following: the selected one or more files, the apps already installed on the first device, or the like. In another embodiment, the source app may identify information or metadata of the above at 508. In yet another embodiment, at 510, the source app may identify or locate the data or an installation package of the recommended content. At 512, the source app automatically selects the content to be transferred to the second device along with the selection of the one or more files. In one aspect, the source app transfers the recommended contents as part of the transmission of the selected one or more files to the second device via the direct device-to-device connection. In one embodiment, in response to the confirmation from the user, the first device transfers the selection and the recommended contents to the second device. In another aspect, the second device may execute the installation package to install the recommended app in the second device, if the recommended content is an app.

Figure 7:
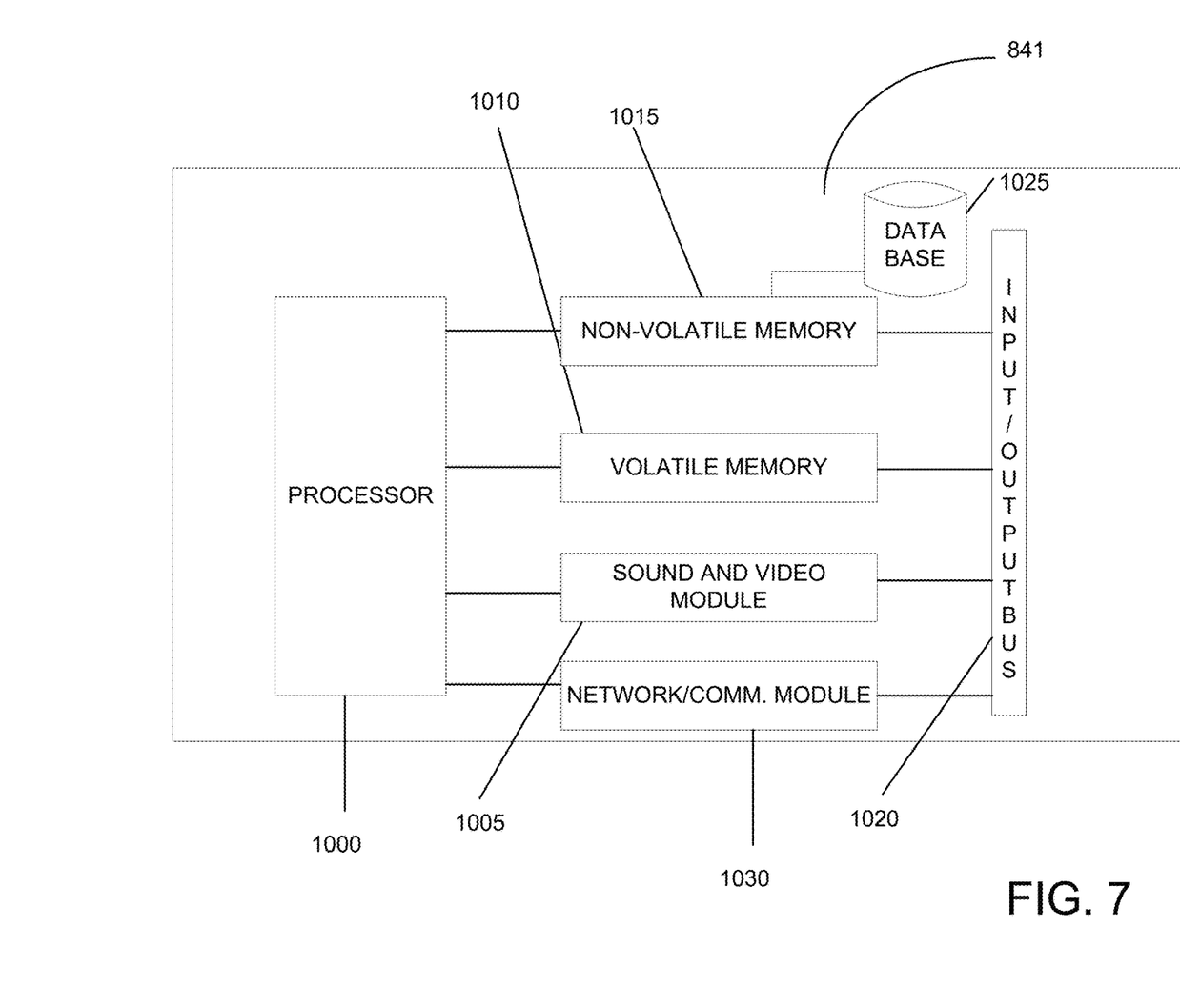
FIG. 7 is a diagram illustrating a computing device according to one embodiment.

FIG. 6 may be a high level illustration of a portable computing device 801 communicating with a remote computing device 841 in FIG. 7 but the application may be stored and accessed in a variety of ways. In addition, the application may be obtained in a variety of ways such as from an app store, from a web site, from a store Wi-Fi® system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 6 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 7. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

The foregoing description of the invention has been presented for purposes of illustration and description and is not intended to be exhaustive or to limit the invention to the precise form disclosed, and obviously many modifications and variations are possible in light of the above teaching. They simulate a user facing the apparatus and various parts are numbered. The basic concept is that the user is able to use the apparatus and obtain an efficient, total body workout, by circuit training with the apparatus.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving graphical user interface (GUI) associated with editing, composing, validating, or submitting API requests as described above. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A mobile computer system for a device-to-device content recommendation comprising:
   a processor configured to execute computer-executable instructions for:
      establishing a directed device-to-device connection between a source app of a first device and a destination app of a second device;
      receiving, at the source app, a selection of one or more files to be transferred to the destination app at the second device via a graphical user interface;
      analyzing, at the source app, one or more of the following: the selected one or more files, and the apps already installed on the first device;
      identifying, by the source app, a content to be recommended to the second device, wherein the identified content may be initially invisible to a user before the selection;
      in response to the identification and the selection, by the source app, locating data of the content in the first device, wherein the data of the content is stored in the first device; and
      automatically selecting the content to be transferred to the second device along with the selection of the one or more files via the directed device-to-device connection;
      wherein the processor is configured to locate an installation package of the content where the content is an application program.

2. The mobile computer system of claim 1, wherein the device-to-device connection comprises a point-to-point wireless connection.

3. The mobile computer system of claim 1, wherein the one or more files comprise one of the following: documents, music files, video files, and image files.

4. The mobile computer system of claim 1, wherein the content comprises one or more of the following: documents, music files, video files, application programs, and image files.

5. The mobile computer system of claim 1, wherein the first device comprises a mobile communication device running a mobile operating system, wherein the mobile operating system comprises an iOS operating system or an android-based operating system.

6. The mobile computer system of claim 1, wherein the second device comprises a mobile communication device running a mobile operating system, wherein the mobile operating system comprises an iOS operating system or an android-based operating system.

7. A mobile computerized method for a device-to-device content recommendation comprising:
   establishing a directed device-to-device connection between a source app of a first device and a destination app of a second device;
   receiving, at the source app, a selection of one or more files to be transferred to the destination app at the second device via a graphical user interface;
   analyzing, at the source app, one or more of the following: the selected one or more files, and the apps already installed on the first device;
   identifying, by the source app, a content to be recommended to the second device, wherein the identified content may be initially invisible to a user before the selection;
   in response to the identification and the selection, by the source app, locating data of the content in the first device, wherein the data of the content is stored in the first device; and
   automatically selecting the content to be transferred to the second device along with the selection of the one or more files via the directed device-to-device connection;
   wherein locating data of the content comprises locating an installation package of the content where the content is an application program.

8. The mobile computerized method of claim 7, wherein the device-to-device connection comprises a point-to-point wireless connection.

9. The mobile computerized method of claim 7, wherein the one or more files comprise one of the following: documents, music files, video files, and image files.

10. The mobile computerized method of claim 7, wherein the content comprises one or more of the following: documents, music files, video files, application programs, and image files.

11. The mobile computerized method of claim 7, wherein the first device comprises a mobile communication device running a mobile operating system, wherein the mobile operating system comprises an iOS operating system or an android-based operating system.

12. The mobile computerized method of claim 7, wherein the second device comprises a mobile communication device running a mobile operating system, wherein the mobile operating system comprises an iOS operating system or an android-based operating system.

13. A mobile computer-readable medium for a device-to-device content recommendation, wherein the computer-readable medium having stored thereon computer-executable instructions comprising:
   establishing a directed device-to-device connection between a source app of a first device and a destination app of a second device;
   receiving, at the source app, a selection of one or more files to be transferred to the destination app at the second device via a graphical user interface;
   analyzing, at the source app, one or more of the following: the selected one or more files, and the apps already installed on the first device;
   identifying, by the source app, a content to be recommended to the second device, wherein the identified content may be initially invisible to a user before the selection;

in response to the identification and the selection, by the source app, locating data of the content in the first device, wherein the data of the content is stored in the first device; and automatically selecting the content to be transferred to the second device along with the selection of the one or more files via the directed device-to-device connection;

wherein locating data of the content comprises locating an installation package of the content where the content is an application program.

14. The mobile computer-readable medium of claim 13, wherein the device-to-device connection comprises a point-to-point wireless connection.

15. The mobile computer-readable medium of claim 13, wherein the one or more files comprise one of the following: documents, music files, video files, and image files.

16. The mobile computer-readable medium of claim 13, wherein the content comprises one or more of the following: documents, music files, video files, application programs, and image files.

17. The mobile computer-readable medium of claim 13, wherein the first device or the second device comprises a mobile communication device running a mobile operating system, wherein the mobile operating system comprises an iOS operating system or an android-based operating system.

* * * * *